G. C. JENSEN.
SHIFTER FORK LOCK.
APPLICATION FILED DEC. 24, 1918.
Patented Feb. 18, 1919.
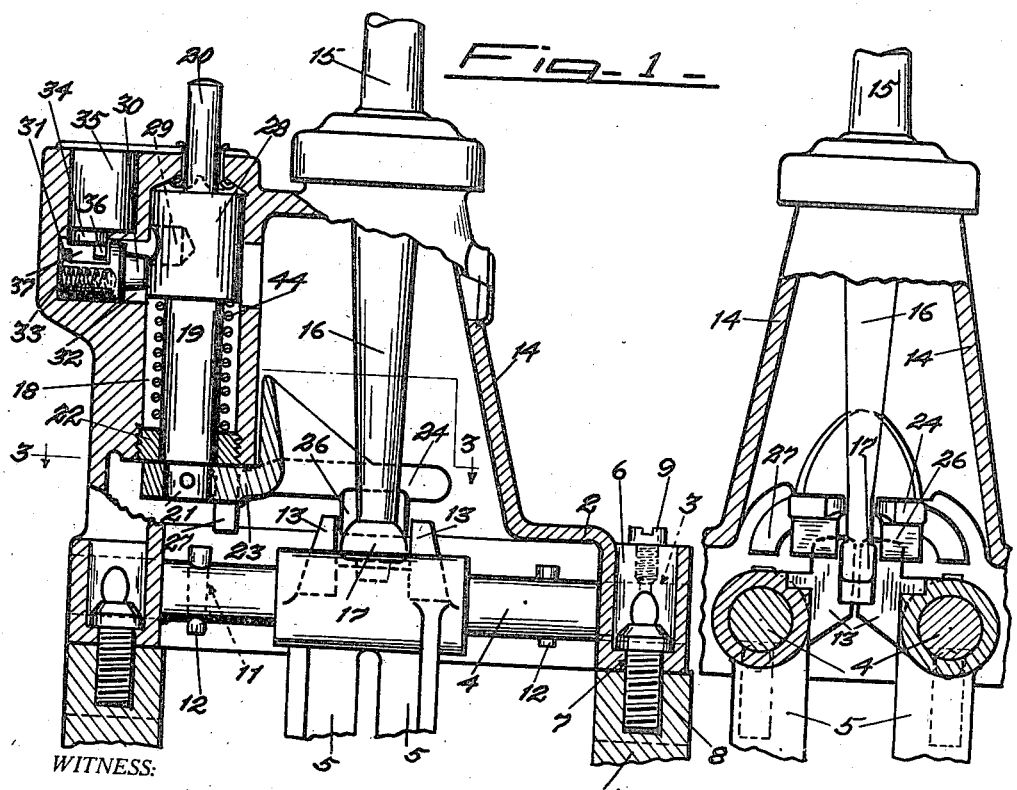

G. C. JENSEN.
SHIFTER FORK LOCK.
APPLICATION FILED DEC. 24, 1918.
1,294,668.
Patented Feb. 18, 1919.
2 SHEETS—SHEET 2.
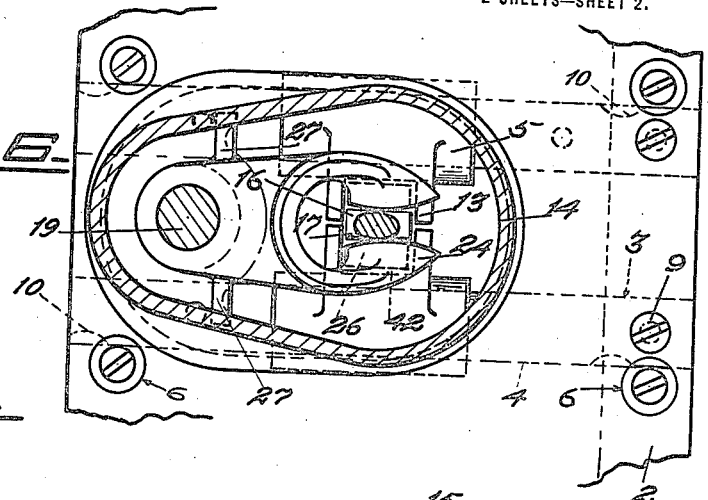
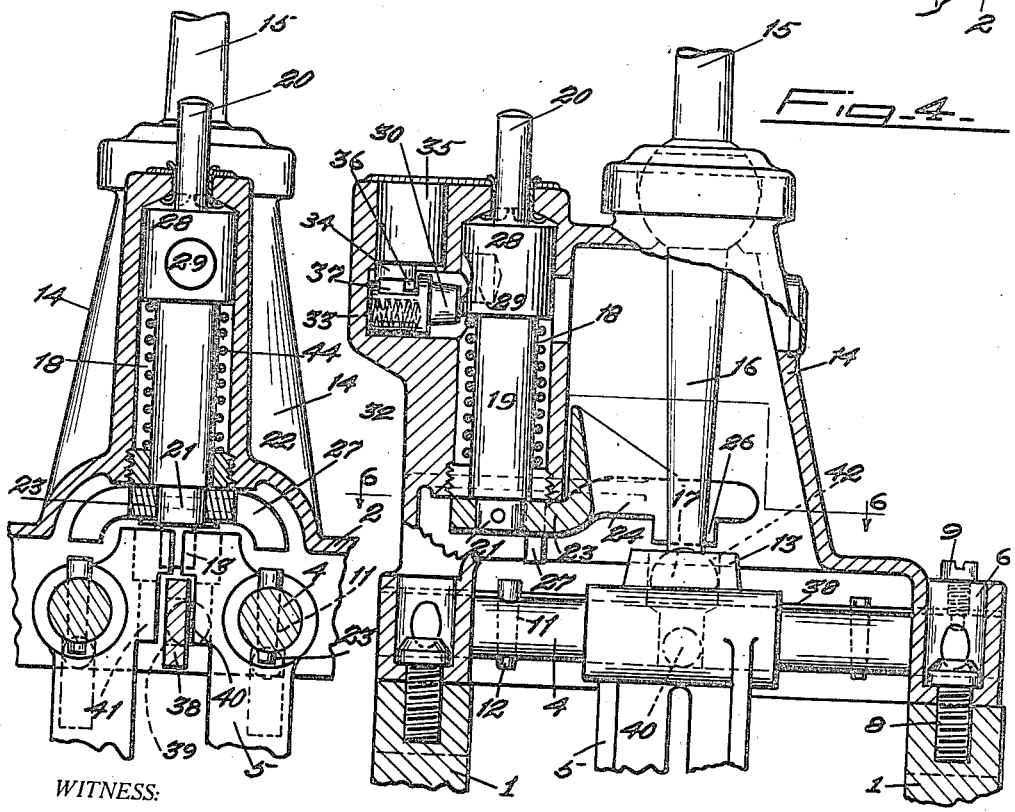

UNITED STATES PATENT OFFICE.

GEORGE C. JENSEN, OF OAKLAND, CALIFORNIA.

SHIFTER-FORK LOCK.

1,294,668.  Specification of Letters Patent.  Patented Feb. 18, 1919.

Application filed December 24, 1918. Serial No. 268,193.

*To all whom it may concern:*

Be it known that I, GEORGE C. JENSEN, a citizen of the United States, residing at Oakland, in the county of Alameda and State of California, have invented certain new and useful Improvements in Shifter-Fork Locks, of which the following is a specification.

The present invention relates to improvements in devices for locking the gear shift devices of motor vehicles from operative movement, and also providing an interlock for retaining one of said devices in its set position during the movement of the other. A further object is to provide a construction whereby the locking of the gear shift device from movement precludes the removal of the device supporting rods from the casing, or the detachment of the cover from the case, and also precludes the removal of the lever from its fulcrum.

The invention consists broadly in the usual shifting forks or members slidably mounted on supporting rods and operated by the usual lever, a member being associated therewith and carried by a locking bolt, the member adapted for engaging the shifting forks when the bolt is moved to locked position, and when the bolt is in unlocked position the same providing a fulcrum on which said member swings, whereby the locking portions of the member provide a retainer for the shifting forks or devices.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in broken side elevation of the preferred embodiment of my invention.

Fig. 2 is a vertical sectional view taken approximately through the center of Fig. 1.

Fig. 3 is a transverse sectional view taken on line 3—3 of Fig. 1.

Fig. 4 is a view similar to Fig. 1, illustrating a modified form of locking member carried by the locking bolt and wherein independent retaining means coöperating with the shifter forks is provided.

Fig. 5 is a vertical sectional view of the construction illustrated in Fig. 4.

Fig. 6 is a transverse sectional view taken on line 6—6 of Fig. 4.

Referring more particularly to the several views of the drawings, wherein like characters of reference designate corresponding parts, the same elements are employed in the modified form of construction as in the preferred embodiment of the invention with the exception that in the modified form of construction a shifter fork retainer device which is independent of the member carried by the locking bolt is provided and in these views the same characters of reference will be employed throughout both the modified and preferred embodiment of the invention.

The numeral 1 indicates a suitable receptacle or gear box over the open top of which is positioned a cover 2 and within which box are positioned the shiftable gears, not shown. The cover 2 is formed at opposite ends with alined supporting rod receiving bores 3, within which are removably positioned the parallel spaced supporting rods 4 on each of which is slidably mounted the gear shift operating fork or member 5. The cover 2 is provided with the vertically disposed bores or recesses 6 terminating at their lower end in a screw passage 7, through which extends a headed securing screw 8 adapted for detachably securing the cover to the case. One of said depressions 6 is provided adjacent each of said bores 3 and intersects the same, whereby the rods 4 when held in position and retained from longitudinal sliding movement within the bores by the clamp screws 9 overlie the headed portion of the screws 8 and prevent the removal of the cover from the case. To facilitate the securing and detachment of the screws 9 from the case 1, the rods 4 are provided adjacent their ends with the notches 10 through which the headed ends of the screws 8 pass when said notches are in alinement with the depressions 6, and prior to the setting of the screws 9. The rods 4 are provided adjacent their ends with bores 11 through which extend the tapered pins 12, the ends of which project beyond the surface of the rod, said projecting surface limiting the movement of said members 5 in either direction on their respective rods, and also limiting the movement of the rods longitudinally within the bores 3. The upper ends of the operating forks or members 5 are provided with the parallel spaced lever engaging lugs 13 which extend inwardly toward each other, as in Figs. 3 and 6 of the drawings, and project upwardly from the upper surface of said forks, as in Figs. 1, 2, 4 and 5 of the drawings.

The cover is formed with an upwardly extended tubular portion 14, within the upper end of which is removably received the operating lever 15 adapted for swinging movement on a universal fulcrum. The lower end 16 of the lever projecting into the interior of said tubular support 14 is enlarged as at 17 at its lower end and projects to a point between the lugs 13, said portion being of such thickness as to be capable of reception between the lugs of either fork, and permitting its surface to clear the ends of the lugs of the adjacent fork. Thus the movement of the lever in one direction permits of the selection of the fork to be operated, and the movement of the lever at right angles to its plane of selective movement permits of the same operating the forks to slide the same longitudinally of the rods 4.

The wall of the tubular member 14 is provided with the vertical channel 18, in which is positioned a vertically movable locking bolt 19, the operating end 20 of which extends upwardly through the upper contracted end of the channel 18 and the lower end 21 of which is reduced and passes through a retaining ring 22 threaded to the side wall of the channel 18. The lower end 21 of the bolt 19, in Figs. 1, 2 and 3, carries a fork and lever locking member and fork retaining member 23, a portion of which is bifurcated, providing parallel spaced arms 24, one overlying the upper end of each of the forks 5. Each of said arms 24 is provided with a downwardly disposed projection 26, one adapted for reception between each of said lugs 13 and adapted one for lying at either side of the lower end of the lever 15. The bolt 19 is capable of axial rotation within the bore 18, due to the selective swinging movement of the lever 15, and when said bolt is in its raised or unlocked position, as in the drawing, and the lever 15 is operated in its selective plane of movement, the member 23 is swung withdrawing said lug in advance of the direction of movement of the lever from between its coöperating lugs 13 and moving the other lug 26 to the outer edge of its coöperating lugs 13, whereby one of said forks 5 is capable of operative movement on the operative movement of the lever, and the other fork is retained from operative movement by the lug 26, lying between the lugs 13 thereof, until such time as the lever is returned to normal position.

On the depressing of the bolt 19, which can only be accomplished when the lever 15 is in neutral position, as in Figs. 3 and 6 of the drawing, the lugs 26 are forced downwardly between the lateral projecting portions of the lugs 13 and prevent operative movement of the forks by the lever, and in this position the enlarged portion 17 of the lever lying beneath the arms 24 precludes the removal of the lever from its socket or fulcrum point by the upward movement thereof.

Adjacent its point of securing to the lower end of the bolt 19 the plate 23 is provided with the laterally extending portions 27 which are adapted on the depressing of the bolt 19 to lie at one side of the upper projecting ends of the pins 12 at adjacent ends of the opposing rods 4, thereby preventing longitudinal movement of the rods 4, should an unauthorized person attempt to drive the same, out of their bores 3.

The bolt 19 is provided with an enlarged latch coöperating portion 28 formed with a recess 29 therein, and into which is adapted to be projected the reduced end 30 of a latch 31 mounted for longitudinal movement in a bore 32 disposed laterally to the bore 18, said latch being forced outwardly by a coiled spring 33. The releasing of the latch is controlled by the operation of the key controlled barrel 34 mounted in a cylinder 35 and carrying at its lower end a tongue 36 extending into a depression 37 in the upper surface of the latch, the tongue being eccentrically disposed on the barrel.

In the modified form a plate 38 extends parallel with and is disposed intermediate the rods 4, the same being supported at its opposite ends in the end wall of the cover 2 and said plate is provided in the region of said forks 5, when the same are in their neutral position, with a transverse bore 39 in which is mounted an interlocking ball 40 adapted for reception in recesses 41 formed in adjacent faces of the forks 5. The ball 40 is of such diameter as to be capable of reception within the recess 41 of one of said forks on the movement of the other fork from neutral position by the operation of the lever 15. In this modified construction, the retaining of one of the forks in its neutral position during the operation of the other is accomplished by the ball 40 instead of the lugs 26 as in the preferred form, and in this modified construction the lugs 26 are received between the upwardly projecting portions of the lugs 13 on the forks 5, but are prevented from removal laterally therebetween by the end walls 42 which connect the outer ends of the lugs on corresponding forks.

On the movement of the lever to neutral position, the depression of the bolt 19 forces the lugs 26 between the respective stops 13 and the laterally extending portions 27 are caused to lie at one side of the member 12; this movement permits the latch 30 to retain the bolt in its locked position with the forks 5 and shafts 4 precluded from longitudinal movement. On the retraction of the latch, the spring 44 surrounding the bolt 19 between the member 22 and the underface of the enlargement 28, restores the bolt to normal position, as in the drawings.

Having thus described my invention, what I claim as new and desire to protect by Letters Patent is:—

1. In combination with a pair of independently movable shifter devices, a lever capable of operative movement to independently operate the same, a pair of spaced stops on said shifter devices between which said lever is receivable on the selective operation of said devices, a longitudinal movable locking bolt disposed angularly to the plane of movement of said shifter devices and adapted for longitudinal movement, a slotted locking plate extending angularly from said bolt with one of the projections on each side of said slot overlying one of said shifter devices and disposed one at each side of said lever, and a lug on each of said projections for overlying said spaced stops, said bolt when in locked position adapted for moving said plate to position said lugs into engagement with said spaced stops to lock said shifter devices from movement.

2. The combination with a pair of independently movable shifter devices, a lever capable of operative movement to independently operate said shifter devices, and provided at its lower end with an enlarged portion, a pair of spaced stops on said shifter devices between which said lever is receivable on the selective operation of said shifter devices, a longitudinally movable locking bolt disposed angularly to the plane of movement of said shifter devices and adapted for longitudinal movement, a slotted locking plate extended angularly therefrom with one of the projections on each side of said slot overlying said shifter devices and disposed one at each side of said lever above said enlarged portion, and a lug on each of said projections for engaging said spaced stops, said bolt when in locked position adapted for moving said plate to position said lugs into engagement with said spaced stops to lock said shifter devices from movement and to overlie said enlarged lever portion preventing detachment of the same from said shifter devices.

3. In combination with a pair of independently movable shifter devices, a lever capable of operative movement to independently operate said shifter devices, a pair of spaced stops on said shifter devices between which said lever is receivable on the selective operation of said shifter devices, a longitudinally movable locking bolt disposed angularly to the plane of movement of said shifter devices and adapted for longitudinal movement and axial rotation, a slotted locking plate extended angularly therefrom with one of the projections on each side of said slot overlying one of said shifter devices and disposed one at each side of said lever, a lug on each of said projections for overlying said spaced stops, said lugs adapted when the bolt is in unlocked position for movement with said lever during the selection of the shifter device to be operated, whereby the selected device is free to operate and the other is locked from operative movement, and means for preventing axial rotation of the bolt when in its locked position with said projections received between said stops.

4. In combination with a pair of independently movable shifter devices, a lever capable of operative movement to independently operate said shifter devices, a pair of spaced stops on said shifter devices between which said lever is receivable on the selective operation of said shifter devices, said stops normally lying directly below said lever when the same is in a perpendicular position, a longitudinally movable locking bolt disposed parallel with said lever at a point removed therefrom, a slotted locking plate extended angularly from said lever with one of the projections on each side of said slot overlying one of said shifter devices and disposed one at each side of said lever, a lug on each of said projections for overlying said spaced stops, said lugs adapted when the bolt is moved to locked position for reception between said spaced stops whereby said shifter devices are locked from movement.

5. In combination with a support provided with alined openings, a shaft removably positioned within said openings with one of its ends received within each of said openings, a projection adjacent one end of said shaft for limiting its longitudinal movement in one direction relative to one of said openings, a shifter device longitudinally movable on said shaft, a lever capable of movement for operating said shifter device, means adapted for movement into locked engagement with said shifter device for preventing operative movement thereof on said shaft, said means adapted for co-operating with said shaft projection to prevent longitudinal movement of the shaft in one direction on the locking of said shifter device from movement.

6. In combination with a pair of independently movable shifter devices provided with stops, a lever capable of movement for selectively operating said shifter devices, a plate positioned adjacent said devices and pivotally supported at one end to permit the free end thereof to swing transversely to the plane of movement of said devices, the free end of said plate being provided with spaced arms lying one at each side of said lever and one coöperating with the stops of the respective shifter devices for retaining the same in their set position, said plate adapted for swinging on its fulcrum by the movement of said lever whereby the selected device is free for operation by said lever and the other device is retained in its set position during the movement of said selected device.

7. In combination with a pair of independently movable shifter devices provided with stops, a lever capable of movement for selectively operating said shifter devices, a plate positioned adjacent said devices and pivotally supported at one end to permit the free end thereof to swing transversely to the plane of movement of said devices, the free end of said plate being provided with spaced arms lying one at each side of said lever and one coöperating with the stops of the respective shifter devices for retaining the same in their set position, said plate adapted for swinging on its fulcrum by the movement of said lever, whereby the selected device is free for operation by said lever and the other device is retained in its set position during the movement of said selected device, and means for locking said plate from swinging movement when said stops are engaged thereby.

8. In combination with a pair of independently movable shifter devices provided with stops, a lever capable of movement for selectively operating said shifter devices, a plate capable of swinging movement at one end transversely of the plane of movement of said devices, said plate provided at one end with spaced arms lying one at each side of said lever and one coöperating with the stops of the respective shifter devices for retaining the same in their set position, said arms adapted for movement transversely of said shifter devices by the lever, whereby the selected device is free for operation by said lever and the other device is retained in its set position during the movement of said selected device, and a locking bolt capable of operation to preclude movement of said plate with the arms thereof associated one with each stop whereby said shifter devices are locked from movement.

9. In combination with a pair of independently movable shifter devices provided with stops, a lever capable of movement for selectively operating said shifter devices, a plate capable of swinging movement at one end transversely of the plane of movement of said devices, said plate provided at one end with spaced arms lying one at each side of said lever and one coöperating with the stops of the respective shifter devices for retaining the same in their set position, said arms adapted for movement transversely of said shifter devices by the lever, whereby the selected device is free for operation by said lever and the other device is retained in its set position during the movement of said selected device, and a longitudinally movable locking bolt providing a support and fulcrum for said plate and adapted for operation to preclude swinging movement of said plate with the arms thereof associated one with each stop whereby said shifter devices are locked from movement.

In testimony whereof I have signed my name to this specification in the presence of a subscribing witness.

GEORGE C. JENSEN.

Witness:
D. B. RICHARDS.